United States Patent [19]

Foster

[11] Patent Number: 5,461,823
[45] Date of Patent: Oct. 31, 1995

[54] VEGETATION BARRIER

[75] Inventor: Thomas M. Foster, Colchester, Ill.

[73] Assignee: Composite Manufacturing & Research, Inc., Allen, Tex.

[21] Appl. No.: 218,365

[22] Filed: Mar. 28, 1994

[51] Int. Cl.$^6$ .................................................. A01G 1/08
[52] U.S. Cl. ........................... 47/33; 71/64.13; 43/131; 239/145
[58] Field of Search ................. 47/24, 245, 23, 47/48.5, 33; 52/101, 232; 71/64.13; 43/131; 239/145

[56] References Cited

U.S. PATENT DOCUMENTS

| | | | |
|---|---|---|---|
| 1,554,865 | 9/1925 | Magoon | 71/64.13 |
| 4,219,964 | 9/1980 | Dale | 47/1.5 |
| 4,224,048 | 9/1980 | Pedergast | 47/48.5 X |
| 4,328,640 | 5/1982 | Revelle | 47/1.5 |
| 4,513,528 | 4/1985 | Dale | 47/1.5 |
| 4,566,219 | 1/1986 | Firth | 43/107 |
| 4,604,167 | 8/1986 | Wakabayashi | 204/29 |
| 4,618,367 | 10/1986 | Bernard | 71/121 |
| 4,991,343 | 2/1991 | Wait | 47/33 |
| 5,035,079 | 7/1991 | Groves | 47/33 |
| 5,067,273 | 11/1991 | Richwine | 47/33 |
| 5,176,738 | 1/1993 | Welter | 504/289 |

FOREIGN PATENT DOCUMENTS

| | | | |
|---|---|---|---|
| 2649033 | 1/1991 | France | 47/25 |
| 2668333 | 4/1992 | France | 47/25 |
| 3064984 | 3/1988 | Japan | 71/64.13 |
| 2115697 | 9/1983 | United Kingdom | 71/64.13 |
| 2227637 | 8/1990 | United Kingdom | 47/33 |

Primary Examiner—Henry E. Raduazo
Attorney, Agent, or Firm—Ross, Clapp, Korn & Montgomery

[57] ABSTRACT

A vegetation barrier includes a water permeable container. The container includes salt.

3 Claims, 1 Drawing Sheet

VEGETATION BARRIER

TECHNICAL FIELD OF THE INVENTION

The present invention relates to a vegetation barrier, and more particularly to a barrier for preventing the spread of unwanted vegetation by causing the vegetation to dehydrate.

BACKGROUND OF THE INVENTION

The control of unwanted vegetation around the lower edging of fencing, sidewalks, adjacent buildings or other structures, and gardens presents a major problem to landscapers and gardeners. Such control is provided by mechanical barriers as well as chemical treatment of areas in which it is desired to prevent the spread of vegetation.

Physical barriers to control vegetation have proven ineffective in that the vegetation may grow and propagate under or around such barriers. Chemical herbicides present environmental concerns for the health and safety of those in contact with the vegetation to be controlled as well as those individuals which normally come in contact with the soil.

A need has thus arisen for a vegetation barrier which is effective and environmentally safe. A need has further arisen for a vegetation barrier that is easy to install and provides lasting vegetation control. SUMMARY OF THE INVENTION In accordance with the present invention, a vegetation barrier is provided. The barrier includes a water permeable container. The container includes salt.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

The present invention provides for a vegetation barrier that controls vegetation through a process of reverse osmosis. It is generally known that water moves from an area of low salt concentration to an area of higher salt concentration. Water typically moves through soil into the roots of the plant because the soil represents an area of low salt concentration while the plant roots have a higher salt concentration. The plant therefore obtains nourishment through the osmotic pressure or movement of the water through soil to the roots of the plant.

The present invention controls vegetation by dehydrating the roots of the plant thereby causing the plant to die. By providing a salt concentration which is higher than the normal salt concentration found in soil and the roots of plants, the present invention causes movement of water through the soil away from the roots of the plant. Without water, the plant dies, and vegetation is controlled.

Figure 1:
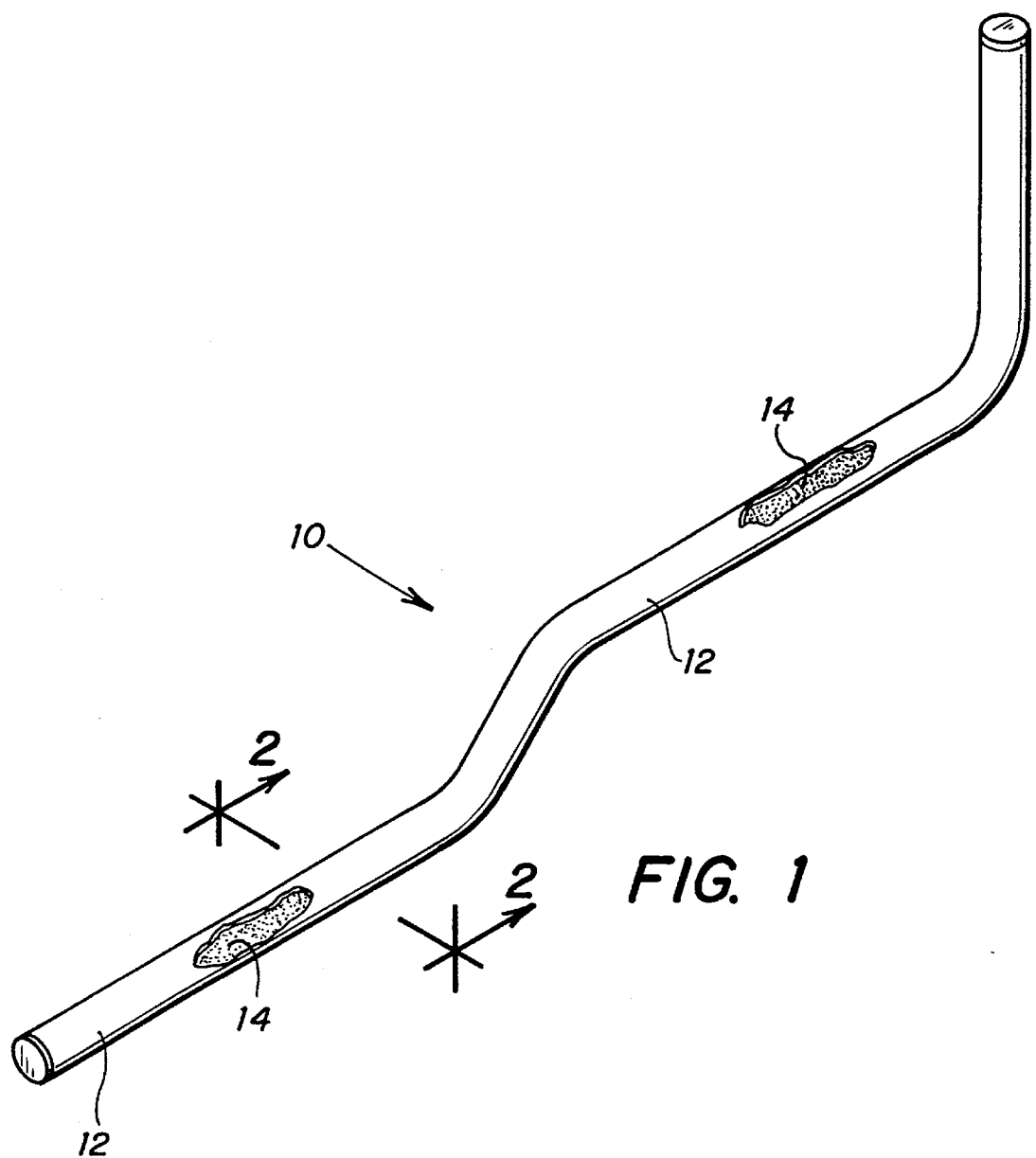
FIG. 1 is perspective view, partially cut away, of a vegetation barrier in accordance with the present invention.
Figure 2:
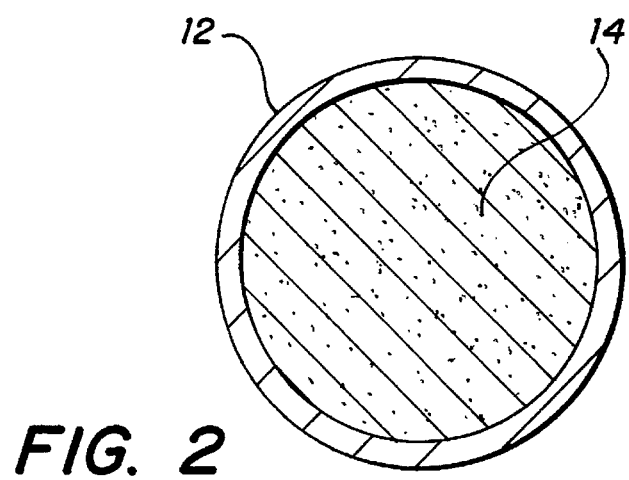
FIG. 2 is a sectional view taken generally along sectional lines 2—2 of FIG. 1.

Referring to FIGS. 1 and 2, the present invention utilizes a water permeable container such as, for example, container 10. Container 10 may include walls 12 composed of cloth or fabric which allow water to enter container 10. Container 10 is flexible, and may be cylindrical in shape. Container 10 conforms to a circular path to define an area from which vegetation will be excluded. Container 10 is similar to a hollow flexible tube.

Disposed within container 10 is a salt mixture 14 including for example, sodium chloride and flour. Approximately 80% of mixture 14 is salt with about 20% flour. Container 10 provides a storage media for mixture 14, and since walls 12 are water permeable, allows water in the soil to move into container 10. Since the concentration of salt within container 10 is greater than the concentration of salt in the soil or in the root system of plants, water moves into container 10 thereby depriving nearby vegetation of water. The dehydrating effect on the roots of the vegetation thereby causes the plants to die.

Any desirable salt may be utilized having the characteristic of drawing water from the soil towards the container 10. Container 10 is fashioned to allow water to enter container 10 and be drawn from the soil.

It therefore can be seen that the present vegetation barrier provides for a simple, economical and environmentally safe barrier to the spread of unwanted vegetation.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A vegetation barrier comprising:

a water permeable container including cloth walls; and a mixture of salt and flour disposed within said container.

2. The vegetation barrier of claim 1 wherein said mixture includes about 80% salt and 20% flour.

3. A vegetation barrier comprising:

a water permeable container having flexible walls including cloth formed in the shape of a cylinder; and a mixture of about 80% salt and 20% flour disposed within said container.

\* \* \* \* \*